UNITED STATES PATENT OFFICE.

JACOB BINLAS, OF TACOMA, WASHINGTON.

FISH-HOOK.

1,175,118.      Specification of Letters Patent.      Patented Mar. 14, 1916.

Application filed August 13, 1914. Serial No. 856,574.

*To all whom it may concern:*

Be it known that I, JACOB BINLAS, a citizen of Jamaica, residing at Tacoma, in the county of Pierce and State of Washington, have invented certain new and useful Improvements in Fish-Hooks, of which the following is a specification.

This invention relates to devices for catching fish and has for its object to provide an automatically operated spearing means whereby the fish will be secured as soon as he gives the bate a pull.

I attain this and other objects by the devices, mechanisms, and arrangements illustrated in the accompanying drawings, in which—

Figure 1:
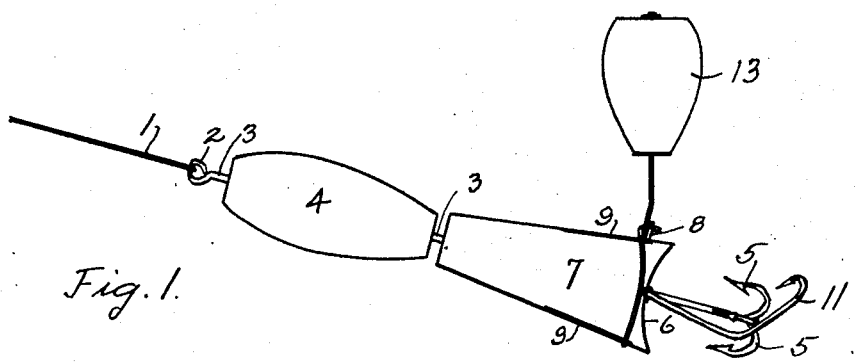
Figure 2:
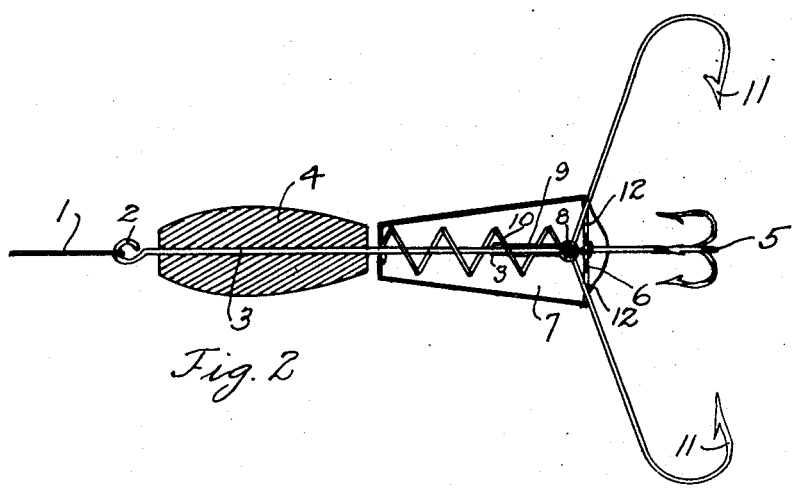
Figure 3:
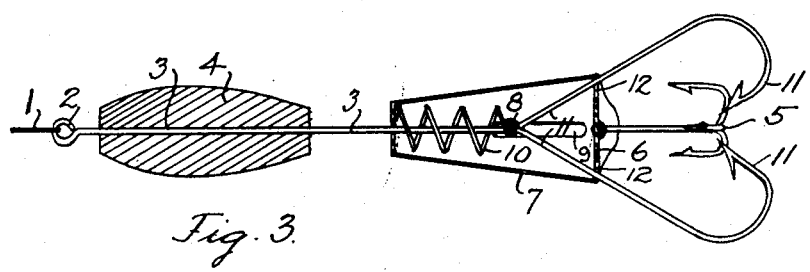

Figure 1 is a side elevation of my device; and Figs. 2 and 3 are horizontal sections thereof showing the parts in normal positions and in the positions they assume when the bait hook is pulled, respectively.

Similar numerals of reference refer to similar parts throughout the several views.

The fish line 1 is secured to the end 2 of the central rod or shank 3. A float 4 is mounted on the rod 3 adjacent to the end 2. The bait hooks 5 are secured to the rear end plate 6 of the conical body 7, which is hollow and which slides freely on the rod 3. A wire pin 8 is secured to the rear of the rod 3 and passes up and down therefrom through slots 9 in the cone 7, and one end of the wire is preferably bent around outside of the cone and twisted around the other end which extends through its slot. A weak compression spring 10 is mounted between the end of the cone 7 and the pin 8 to keep the pin pressed rearward when no strain is on the bait hook 5. A pair of spearing hooks 11 are pivotally mounted on the pin 8 and pass therefrom through holes 12 in the end 6 of the cone. The hooks 11 extend on each side of the bait hook 5, as shown in Fig. 2, when no strain is on the said hook 5, but as soon as the said hook 5 is pulled by a fish the cone 7 is slid down the rod 3, compressing the spring 10, thus causing the holes 12 in the end plate 6 of the cone to force the points of the said spearing hooks 11 inward to pierce the head of the fish on both sides, thus effectually securing it on the hook.

A supplementary float 13 may be attached to the rear end of the cone 7, or to the pin wire 8, to keep the spear hook 11 extending out horizontally on each side of the bait hook 5.

Having described my invention, what I claim is:—

In a fish hook, the combination with a rod secured to the fish line; a cone slidably mounted thereon; a spring within the cone to keep it pressed rearward; a bait hook secured to the end of the cone; and a pair of spearing hooks mounted on the rod and passing through holes in the cone, whereby said hooks normally extend out on each side of the bait hook, but, when the bait hook is pulled and said cone is slid on the rod, the said spear hooks are forced inward to pierce the head of the fish.

JACOB BINLAS.

Witnesses:
  M. F. McNEIL,
  E. K. BARNARD.